United States Patent
Zhou et al.

(10) Patent No.: US 12,154,359 B2
(45) Date of Patent: Nov. 26, 2024

(54) METHOD AND APPARATUS FOR DETECTING TABLE, DEVICE AND STORAGE MEDIUM

(71) Applicant: Beijing Baidu Netcom Science Technology Co., Ltd., Beijing (CN)

(72) Inventors: Xia Zhou, Beijing (CN); Leyi Wang, Beijing (CN); Qiaoyi Li, Beijing (CN); Duohao Qin, Beijing (CN); Minghao Liu, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 329 days.

(21) Appl. No.: 17/743,687

(22) Filed: May 13, 2022

(65) Prior Publication Data

US 2022/0277575 A1    Sep. 1, 2022

(30) Foreign Application Priority Data

Aug. 12, 2021 (CN) .......................... 202110923843.9

(51) Int. Cl.
*G06V 30/413* (2022.01)
*G06V 10/75* (2022.01)

(52) U.S. Cl.
CPC .......... *G06V 30/413* (2022.01); *G06V 10/751* (2022.01)

(58) Field of Classification Search
CPC ............................................. G06V 30/40–43
See application file for complete search history.

(56) References Cited

U.S. PATENT DOCUMENTS

| 9,311,568 | B1* | 4/2016 | Feller | G06V 20/62 |
| 2003/0097384 | A1* | 5/2003 | Hu | G06V 30/414 |
| | | | | 715/234 |

(Continued)

FOREIGN PATENT DOCUMENTS

| CN | 109522816 A | 3/2019 |
| CN | 110287854 A | 9/2019 |

(Continued)

OTHER PUBLICATIONS

Dong et al "Semantic Structure Extraction for Spreadsheet Tables with a Multi-task Learning Architecture" NeurIPS 2019 Workshop Document Intelligence Program Chairs Published: Nov. 1, 2019,. (Year: 2019).*

(Continued)

*Primary Examiner* — Sean T Motsinger
(74) *Attorney, Agent, or Firm* — Ice Miller LLP

(57) ABSTRACT

A method and apparatus for detecting a table. The method includes: acquiring a to-be-processed image; inputting the to-be-processed image into a pre-trained deep learning model, and outputting a full table detection branch result, a column detection branch result and a header detection branch result through the deep learning model; where the full table detection branch result represents a detection result for a full table in the to-be-processed image, the column detection branch result represents a detection result for a column in the table in the to-be-processed image, and the header detection branch result represents a detection result for a header in the to-be-processed image; and obtaining a detection result of the table in the to-be-processed image, based on the full table detection branch result, the column detection branch result and the header detection branch result.

17 Claims, 4 Drawing Sheets

Acquiring a to-be-processed image — S101

Inputting the to-be-processed image into a pre-trained deep learning model, and outputting a full table detection branch result, a column detection branch result and a header detection branch result through the deep learning model — S102

Obtaining a detection result of the table in the to-be-processed image, based on the full table detection branch result, the column detection branch result and the header detection branch result — S103

(56) References Cited

U.S. PATENT DOCUMENTS

| | | | |
|---|---|---|---|
| 2019/0171704 A1 | 6/2019 | Buisson et al. | |
| 2021/0035288 A1 | 2/2021 | Liu | |
| 2021/0383107 A1 | 12/2021 | Li | |
| 2022/0277575 A1* | 9/2022 | Zhou | G06V 10/82 |
| 2022/0319217 A1* | 10/2022 | Paliwal | G06V 10/82 |
| 2023/0237080 A1* | 7/2023 | Pinho | G06V 30/412 |
| | | | 706/16 |
| 2023/0419705 A1* | 12/2023 | Truscott | G06F 9/453 |
| 2023/0419706 A1* | 12/2023 | Prasad | G06V 30/414 |

FOREIGN PATENT DOCUMENTS

| | | |
|---|---|---|
| CN | 111523420 A | 8/2020 |
| CN | 111709339 A | 9/2020 |
| CN | 112883926 A | 6/2021 |
| WO | 2021053687 A1 | 3/2021 |

OTHER PUBLICATIONS

S. Paliwal et al.; "TableNet: Deep Learning model for end-to-end Table detection and Tabular data extraction from Scanned Document Images"; 2019 International Conference on Document Analysis and Recognition (ICDAR); IEEE, pp. 128-133, published 2019; DOI: 10.1109/ICDAR.2019.00029 (6 pages).

Tran Tuan Ahn, et al., "A Hybrid Method for Table Detection from Document Image," 2015 3rd IAPR Asian Conference on Pattern Recognition, IEEE, 2015 [5 Pages].

Ze-qiang Wang, et al., "Detecting Table Based on YOLOv3 and Morphological Function," Computer Knowledge and Technology, Jan. 2021, vol. 17, No. 2 [3 Pages].

\* cited by examiner

Follow this list for inspection, medicine receiving, examination, treatment and other items (except for medicinal vesiculation))

Traditional Chinese Medicine [Delivery]    please go to the smart medical service area for handling    Subtotal:

Number of doses: 14

| Medicine Name | Total | Amount/Class |
|---|---|---|
| Radix glycyrrhizae preparata | 5g*14 | 7.09/Class B |
| Cuscuta chinensis (salted) | 15g*14 | 37.80/Class B |
| Cinnamomum cassia | 5g*14 | 2.89/Class B |
| Erigeron breviscapus (Dengzhanhua) | 1 bag*14 | 241.50/Class B |
| Radix paeoniae alba | 10g*14 | 11.38/Class B |
| Ligusticum wallichii (Wine Chuanxiong) | 10g*14 | 15.05/Class B |
| Dried motherwort | 15g*14 | 9.20/Class B |

| Medicine Name | Total | Amount/Class |
|---|---|---|
| Coix Seed (Coix Rice) | 15g*14 | 10.50/Class B |
| Rehmannia glutinosa (Shudi) | 10g*14 | 8.75/Class B |
| Polygonatum (wine Polygonatum) | 10g*14 | 25.90/Class B |
| Angelica | 5g*14 | 19.25/Class B |
| Fructus lycii | 15g*14 | 27.30/Class B |
| Artemisia argyi | 5g*14 | 1.75/Class B |
| Hedysarum polybotrys | 1 bag*14 | 246.40/Class B |

Subtotal:

| Item name | Quantity | Unit price | Amount (yuan) |
|---|---|---|---|
| Deputy Chief Physician Outpatient Consultation Fee | 1 | | |

Subtotal:

| Examination/Treatment/Surgery/Laboratory Items | Quantity | Executive department | Unit price | Amount |
|---|---|---|---|---|
| 6 sex hormones | 1 | Blood sampling room, F2, outpatient | | |
| Thyroid Stimulating Hormone (TSH) | 1 | Blood sampling room, F2, outpatient | | |

Fig. 4

METHOD AND APPARATUS FOR DETECTING TABLE, DEVICE AND STORAGE MEDIUM

CROSS-REFERENCE TO RELATED APPLICATIONS

This patent application claims the priority of Chinese Patent Application No. 202110923843.9, filed on Aug. 12, 2021, and entitled "Method and Apparatus for Detecting Table, Device and Storage Medium", the entire content of which is herein incorporated by reference.

TECHNICAL FIELD

The present disclosure relates to the technical field of artificial intelligence, in particular to the fields of deep learning, big data and the like, and more particular to a method and apparatus for detecting a table, a device and a storage medium.

BACKGROUND

With the popularization of mobile devices with cameras, more and more customers take pictures and upload file pictures using these devices, thus extracting effective information from the file pictures also becomes a basic task. While tables are an important part of daily office processing documents, in many applications, information is often presented in the form of table. Therefore, in people's daily life and work, it is often necessary to detect a table to extract the information in the table.

SUMMARY

The present disclosure provides a method and apparatus for detecting a table, a device and a storage medium.

According to a first aspect of the present disclosure, a method for detecting a table is provided. The method includes: acquiring a to-be-processed image; inputting the to-be-processed image into a pre-trained deep learning model, and outputting a full table detection branch result, a column detection branch result and a header detection branch result through the deep learning model; where the full table detection branch result represents a detection result for a full table in the to-be-processed image, the column detection branch result represents a detection result for a column in the table in the to-be-processed image, and the header detection branch result represents a detection result for a header in the to-be-processed image; and obtaining a detection result of the table in the to-be-processed image, based on the full table detection branch result, the column detection branch result and the header detection branch result.

According to a second aspect of the present disclosure, an apparatus for detecting a table is provided. The apparatus includes: a first acquiring module, configured to acquire a to-be-processed image; a model processing module, configured to input the to-be-processed image into a pre-trained deep learning model, and output a full table detection branch result, a column detection branch result and a header detection branch result through the deep learning model; where the full table detection branch result represents a detection result for a full table in the to-be-processed image, the column detection branch result represents a detection result for a column in the table in the to-be-processed image, and the header detection branch result represents a detection result for a header in the to-be-processed image; and a determining module, configured to obtain a detection result of the table in the to-be-processed image, based on the full table detection branch result, the column detection branch result and the header detection branch result.

According to a third aspect of the present disclosure, an electronic device is provided. The electronic device includes at least one processor; and a memory communicatively connected to the at least one processor. The memory stores instructions executable by the at least one processor, and the instructions, when executed by the at least one processor, cause the at least one processor to perform the method according to the first aspect.

According to a fourth aspect of the present disclosure, a non-transitory computer readable storage medium storing computer instructions is provided. The computer instructions are used to cause the computer to perform the method according to the first aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not constitute a limitation to the present disclosure.

FIG. 4 is a schematic diagram of a result of table detection provided by an embodiment of the present disclosure;

DETAILED DESCRIPTION OF EMBODIMENTS

Figure 1:
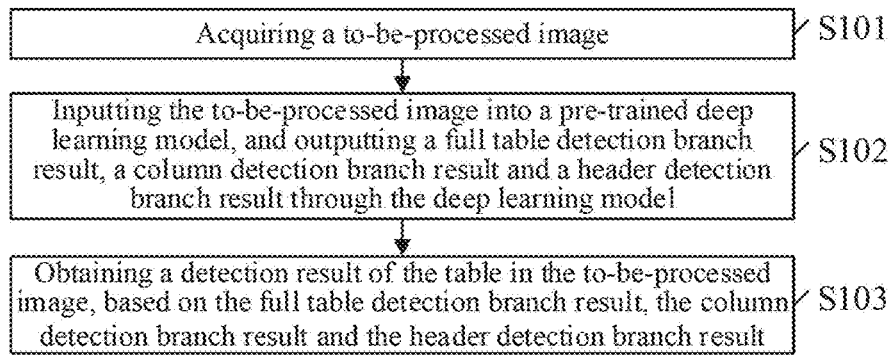
FIG. 1 is a flowchart of a method for detecting a table in an embodiment of the present disclosure.

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described here without departing from the scope and spirit of the present disclosure. Similarly, for clearness and conciseness, descriptions of well-known functions and structures are omitted in the following description.

A method for detecting a table in the related art generally detects standard tables. For example, for a table having a clear boundary line, the detection of the table is implemented by detecting the boundary line. However, there may be no clear boundary lines in some tables, which may be understood as non-normative tables. The layout of medical detailed bills is complex and changes between the same layouts are large, which increases the difficulty of table detection. In the related art, this detection method for standard tables cannot complete the detection of non-normative tables. In addition, there are often problems such as multi-column tables, inclinations and wrinkles in actual data, resulting in poor performance of the common table detection method in detailed data.

Medical details occupy an important part of medical reimbursement bills, and the important part is text structure in the form of table. Tables are used to present basic information in a structured way, in which table detection is a key step of table information extraction. In actual business scenarios, typically, only a paper version of detailed bills or image data uploaded by users can be obtained. How to extract key information that can be structured and stored from these paper documents or document photos, so as to electronically convert these documents, involves a large number of related technologies of image text recognition, such as text detection, structured analysis, end-to-end text detection and recognition, table extraction, and the like.

An embodiment of the present disclosure proposes a parallel multi-branch table detection method, which uses a convolutional neural network to learn pixel-level category information based on image features, and predicts a range of full image, a range of table columns, and a range of table header rows, respectively. Table column information and table header position information strengthen the detection of table range, which significantly improves the accuracy and usability of table image content parsing.

An embodiment of the present disclosure provides a method for detecting a table area of detail category, which can improve the accuracy of table detection, and is an important basis for subsequent information extraction based on a detected table. In addition, a feasible detection method for non-normative tables is provided, that is, the detection of non-normative tables such as medical detailed bills can be realized.

The method for detecting a table provided by an embodiment of the present disclosure detects the header, the table column and the full table in parallel, uses prior information of a table structure to assist the detection of the table, and realizes extraction of the header row and extraction of the table column while performing full table detection. In addition, the prior knowledge of the table structure is considered in an embodiment of the present disclosure, that is, a deep learning model is trained by using a plurality of sample images, so that the deep learning model can learn the structure information of the table, so as to avoid a problem of missed detection or over-detection in scenarios of table detection. In addition, for a table detection scheme of medical detailed bills in natural scenarios, the table structure information is added, which effectively addresses the problems such as complex layout of the detailed bills.

The method for detecting a table provided by the embodiments of the present disclosure will be described in detail below.

The method for detecting a table provided by the embodiments of the present disclosure may be applied to electronic devices such as servers, terminals, and the like.

An embodiment of the present disclosure provides a method for detecting a table, as shown in FIG. 1, which may include the following steps.

S101, acquiring a to-be-processed image;

S102, inputting the to-be-processed image into a pre-trained deep learning model, and outputting a full table detection branch result, a column detection branch result and a header detection branch result through the deep learning model.

The full table detection branch result represents a detection result for a full table in the to-be-processed image, the column detection branch result represents a detection result for a column in the table in the to-be-processed image, and the header detection branch result represents a detection result for a header in the to-be-processed image.

S103, obtaining a detection result of the table in the to-be-processed image, based on the full table detection branch result, the column detection branch result and the header detection branch result.

In an embodiment of the present disclosure, through the deep learning model, in addition to obtaining the full table detection branch result, the column detection branch result and the header detection branch result are also obtained. Based on the full table detection branch result, the column detection branch result, and the header detection branch result, the detection result of the table in the to-be-processed image is obtained, in this way, the accuracy of table detection can be improved.

Referring to FIG. 1, the method for detecting a table provided by an embodiment of the present disclosure may include the following steps.

S101, acquiring a to-be-processed image.

The to-be-processed image may be an image containing a table. Tables may include normative tables and non-normative tables, and normative tables may be understood as standard tables, such as tables with clear table boundary lines. Non-normative tables may include tables without table boundary lines; there are multi-column tables; table inclinations and wrinkles, and the like.

In one way, an image containing a table may be directly acquired; in another way, an image collected from a paper table may be obtained, for example, the to-be-processed image may include an image collected and obtained from a medical detailed bill.

S102, inputting the to-be-processed image into a pre-trained deep learning model, and outputting a full table detection branch result, a column detection branch result and a header detection branch result through the deep learning model.

The full table detection branch result represents a detection result for a full table in the to-be-processed image, the column detection branch result represents a detection result for a column in the table in the to-be-processed image, and the header detection branch result represents a detection result for a header in the to-be-processed image.

In an embodiment of the present disclosure, a deep learning network is obtained by pre-training using a plurality of sample images, and the deep learning network may output three results respectively through three branches, that is, output the full table detection branch result through the full table detection branch, output the column detection branch result through the column detection branch and output the header detection branch result through the header detection branch. In this way, after the trained deep learning network is obtained, the pre-trained deep learning network may be directly used to output the full table detection branch result, the column detection branch result and the header detection branch result of the to-be-processed image. The process of pre-training to obtain the deep learning network will be described subsequently in detail, and detailed description thereof will be omitted.

S103, obtaining a detection result of the table in the to-be-processed image, based on the full table detection branch result, the column detection branch result and the header detection branch result.

It may be simply understood that the table is detected from the three dimensions of the full table (that is, the entire table), the columns of the table, and the header of the table. The detection result of the columns of the table and the detection result of the header of the table may be used to strengthen the detection of table range. Specifically, the detection of table range may be strengthened by position information of the columns of the table and position information of the header of the table. It may also be understood that the range of the table is further limited by the detection result of the columns of the table and the detection result of the header of the table, so that the detection accuracy can be improved.

The to-be-processed image may be input into the deep learning model. The deep learning model first extracts features of the to-be-processed image, and then inputs a result of the feature extraction into the full table detection branch, the column detection branch and the header detection branch, respectively. The deep learning model outputs the full table detection branch result, the column detection branch result and the header detection branch result, that is, the to-be-processed image is input into the deep learning model, and the full table detection branch result, the column detection branch result and the header detection branch result are output through the deep learning model.

In an alternative embodiment, S103 may include: superimposing the full table detection branch result, the column detection branch result and the header detection branch result; and fitting a boundary range to a result obtained by the superposition, to obtain a detection frame for the table in the to-be-processed image.

The full table detection branch result may represent a position of the full table, i.e., the entire table, in the to-be-processed image, such as a detection frame of the full table in the to-be-processed image; the column detection branch result may represent a position of a column of the table in the to-be-processed image, such as a detection frame of each column in the to-be-processed image; and the header detection branch result may indicate a position of the header in the to-be-processed image, such as a detection frame of the header in the to-be-processed image.

The full table detection branch result, the column detection branch result and the header detection branch result may be superimposed, or it may be understood that pixels in the full table detection branch result, the column detection branch result and the header detection branch result are aligned one by one, to calculate a union of the detection frame of the full table in the to-be-processed image, the detection frames of columns in the to-be-processed image and the detection frame of the header in the to-be-processed image, then the boundary range is fitted to the result obtained by the union, for example, calculating a minimum enclosing rectangle, etc.

In an embodiment of the present disclosure, the full table detection branch result, the column detection branch result and the header detection branch result are superimposed; for the result obtained by the superposition, the boundary range is fitted, the column detection branch result and the header detection branch result can be used to further constrain the full table detection branch result, thereby improving the accuracy of table detection. In addition, by superimposing the full table detection branch result, the column detection branch result and the header detection branch result, and fitting a boundary range to a result obtained by the superposition, the full table detection branch result, the column detection branch result and the header detection branch result obtained through the deep learning model may be easily integrated to obtain the final detection result of the table.

In an alternative embodiment, the full table detection branch result includes a full table detection branch binary map, and the full table detection branch binary map indicates whether each pixel in the to-be-processed image belongs to the full table; the column detection branch result includes a column detection branch binary map, the column detection branch binary map indicates whether each pixel in the to-be-processed image belongs to the column in the table; and the header detection branch result includes a header detection branch binary map, and the header detection branch binary map indicates whether each pixel in the to-be-processed image belongs to the header.

The binary map is the same size as the to-be-processed image. In the binary map, whether a pixel belongs to a category corresponding to the branch is indicated by different pixel values of pixel.

The full table detection branch binary map indicates whether a pixel belongs to the full table through different pixel values of the pixel. The column detection branch binary map indicates whether a pixel belongs to the column of the table through different pixel values of the pixel. The header detection branch binary map indicates whether a pixel belongs to the header through different pixel values of the pixel.

The full table detection branch binary map, the column detection branch binary map and the header detection branch binary map may use the same pixel value to indicate whether each pixel in the to-be-processed image belongs to the category corresponding to the branch. For example, for each pixel, a pixel value of 1 in the full table detection branch binary map indicates that the pixel in the to-be-processed image belongs to the full table, a pixel value of 1 in the column detection branch binary map indicates that the pixel in the to-be-processed image belongs to the column of the table, and a pixel value of 1 in the header detection branch binary map indicates that the pixel in the to-be-processed image belongs to the header of the table; a pixel value of 0 in the full table detection branch binary map indicates that the pixel in the to-be-processed image does not belong to the full table, a pixel value of 0 in the column detection branch binary map indicates that the pixel in the to-be-processed image does not belong to the column of the table, and a pixel value of 0 in the header detection branch binary map indicates that the pixel in the to-be-processed image does not belong to the header of the table. Alternatively, a pixel value of 0 in the full table detection branch binary map indicates that the pixel in the to-be-processed image belongs to the full table, a pixel value of 0 in the column detection branch binary map indicates that the pixel in the to-be-processed image belongs to the column of the table, and a pixel value of 0 in the header detection branch binary map indicates that the pixel in the to-be-processed image belongs to the header of the table; a pixel value of 1 in the full table detection branch binary map indicates that the pixel in the to-beprocessed image does not belong to the full table, a pixel value of 1 in the column detection branch binary map indicates that the pixel in the to-be-processed image does not belong to the column of the table, and a pixel value of 1 in the header detection branch binary map indicates that the pixel in the to-be-processed image does not belong to the header of the table.

Figure 2:
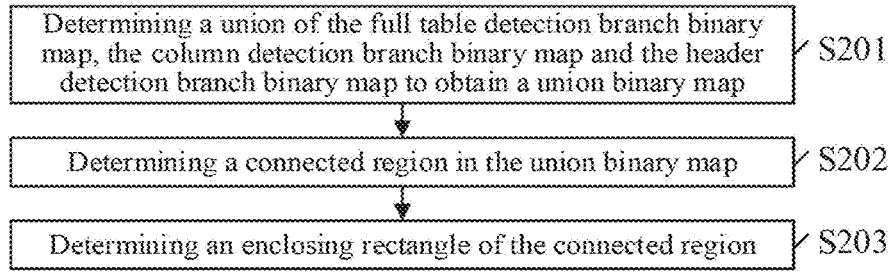
FIG. 2 is a flowchart of obtaining a detection result of a table in a to-be-processed image based on a full table detection branch result, a column detection branch result, and a header detection branch result in an embodiment of the present disclosure.

As shown in FIG. 2, superimposing the full table detection branch result, the column detection branch result and the header detection branch result, may include the following steps.

S201, obtaining a union of the full table detection branch binary map, the column detection branch binary map and the header detection branch binary map to obtain a union binary map.

It may be understood as obtaining a union of the pixel values indicating that the pixel belongs to the corresponding category of each branch in the full table detection branch binary map, the column detection branch binary map and the header detection branch binary map. For example, for each pixel, a pixel value of 1 in the full table detection branch binary map indicates that the pixel in the to-be-processed image belongs to the full table, and a pixel value of 0 in the full table detection branch binary map indicates that the pixel in the to-be-processed image does not belong to the full table; a pixel value of 1 in the column detection branch binary map indicates that the pixel in the to-be-processed image belongs to the column of the table, and a pixel value of 0 in the column detection branch binary map indicates that the pixel in the to-be-processed image does not belong to the column of the table; and a pixel value of 1 in the header detection branch binary map indicates that the pixel in the to-be-processed image belongs to the header of the table, and a pixel value of 0 in the header detection branch binary map indicates that the pixel in the to-be-processed image does not belong to the header of the table. Then, obtain a union of the pixels with the pixel value of 1 in the full table detection branch binary map, the column detection branch binary map and the header detection branch binary map, that is, for a pixel, as long as there is one binary map whose pixel value of the pixel is 1 in the full table detection branch binary map, the column detection branch binary map and the header detection branch binary map, then the pixel value of the pixel in the obtained union binary map is 1.

For example, for each pixel, a pixel value of 0 in the full table detection branch binary map indicates that the pixel in the to-be-processed image belongs to the full table, and a pixel value of 1 in the full table detection branch binary map indicates that the pixel in the to-be-processed image does not belong to the full table; a pixel value of 0 in the column detection branch binary map indicates that the pixel in the to-be-processed image belongs to the column of the table, and a pixel value of 1 in the column detection branch binary map indicates that the pixel in the to-be-processed image does not belong to the column of the table; and a pixel value of 0 in the header detection branch binary map indicates that the pixel in the to-be-processed image belongs to the header of the table, and a pixel value of 1 in the header detection branch binary map indicates that the pixel in the to-be-processed image does not belong to the header of the table. Then, determine a union of the pixels with the pixel value of 0 in the full table detection branch binary map, the column detection branch binary map and the header detection branch binary map, that is, for a pixel, as long as there is one binary map whose pixel value of the pixel is 0 in the full table detection branch binary map, the column detection branch binary map and the header detection branch binary map, then the pixel value of the pixel in the obtained union binary map is 0.

A binary map is obtained, and the pixel value of each pixel in the binary map is the union of pixel values of the pixel in the full table detection branch binary map, the column detection branch binary map and the header detection branch binary map, and the binary map is the obtained union binary map.

The fitting a boundary range to a result obtained by the superposition, to obtain a detection frame for the table in the to-be-processed image, may include the following steps.

S202, determining a connected region in the union binary map.

The connected region may be understood as a set of adjacent pixels with the same pixel value.

The determining a connected region in the union binary map may include: finding and labeling adjacent pixels with a given pixel value in the union binary map.

In an embodiment of the present disclosure, any method for determining a connected region in a binary map may be used to determine the connected region in the union binary map, and the embodiments of the present disclosure do not limit the method for determining a connected region.

In an implementation, the to-be-processed image may include a plurality of tables, and different tables may be distinguished by determining the connected region.

S203, determining an enclosing rectangle of the connected region.

The enclosing rectangle is the detection frame for the table in the to-be-processed image.

Specifically, a minimum enclosing rectangle of the connected region may be determined.

In this way, the table may be detected.

In an embodiment of the present disclosure, multi-branch detection is performed through a deep learning network. Specifically, the detection of three branches is performed through the deep learning network. In addition to full table detection, there are also column detection and header detection. A union of the results of the three branches output by the network are determined, and then the enclosing rectangle is fitted to finally obtain the detection result, which can improve the detection accuracy. At the same time, the binary maps are used to represent the results of the three branches, and the binary maps are processed to obtain the detection result of the table in the to-be-processed image based on the full table detection branch result, the column detection branch result and the header detection branch result, so that the calculation is easy.

In addition, the method for detecting a table provided by an embodiment of the present disclosure may realize the detection of non-normative tables, such as detailed bills, that is, the method may realize the detection of various forms of tables, and can improve the usability of table detection.

Figure 3:
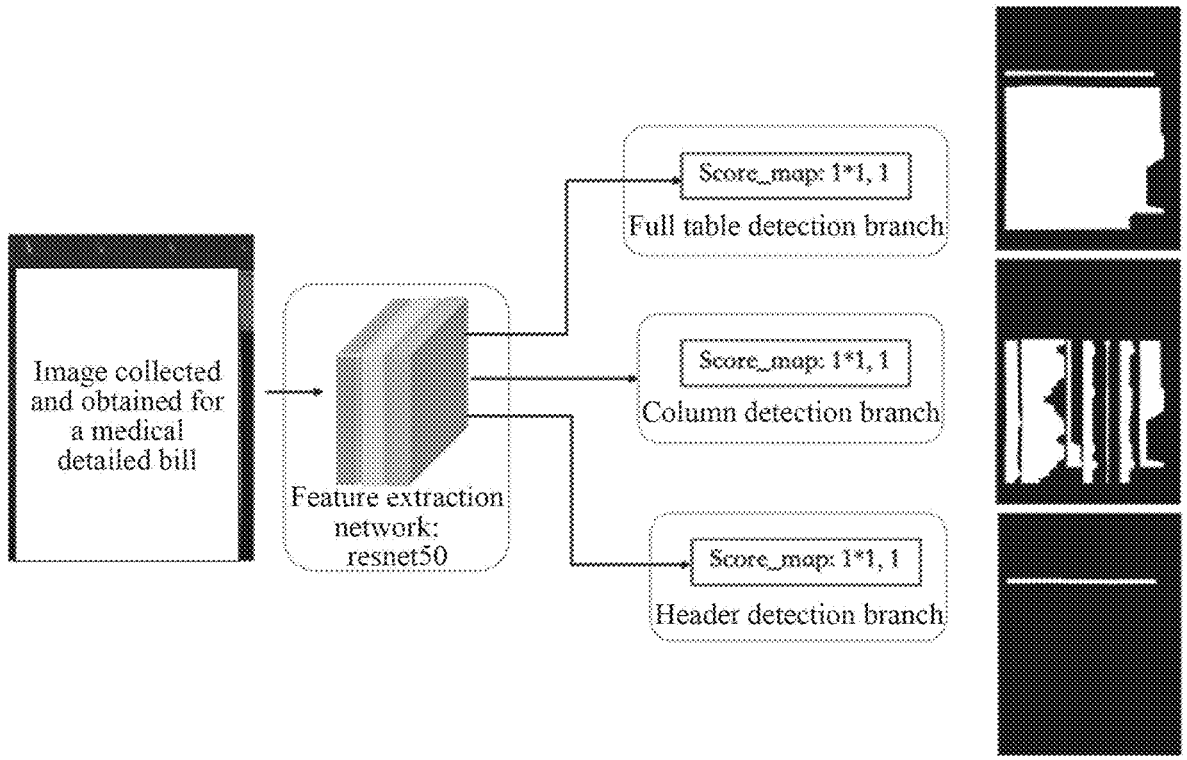
FIG. 3 is a schematic diagram of outputting three branch results through a deep learning model in an embodiment of the present disclosure.

As shown in FIG. 3, a deep learning model may include a feature extraction module and three branches: a full table detection branch, a column detection branch and a header detection branch. A to-be-processed image collected and obtained for a medical detailed bill is input into the deep learning model. The deep learning model first performs feature extraction on the to-be-processed image, and then inputs a feature extraction result into the full table detection branch, the column detection branch and the header detection branch, respectively. The full table detection branch respectively predicts a Score_map corresponding to each pixel in the image, that is, a full table detection branch binary map. Similarly, the column detection branch and the header detection branch predict a Score_map of the category to which each pixel belongs, that is, a column detection branch binary map and a header detection branch binary map. In FIG. 3, Score_map:1*1, 1 represents a single-channel output binary map. In this example, the full table detection branch binary map indicates that the pixel belongs to the full table by a pixel value of the pixel being 0. Correspondingly, the column detection branch binary map also indicates that the pixel belongs to the column of the table by a pixel value of the pixel being 0, and the header detection branch binary map also indicates that the pixel belongs to the header by a pixel value of the pixel being 0.

After the results of the three branches are output through the deep learning model, a final prediction result, that is, a table detection result, is obtained by superimposing the results of the three branches and then fitting a boundary range, as shown in FIG. 4. Specifically, the process of finally determining the detection result of the table based on the results of the three branches has been described in detail in the above embodiment, and detailed description thereof will be omitted.

Figure 5:
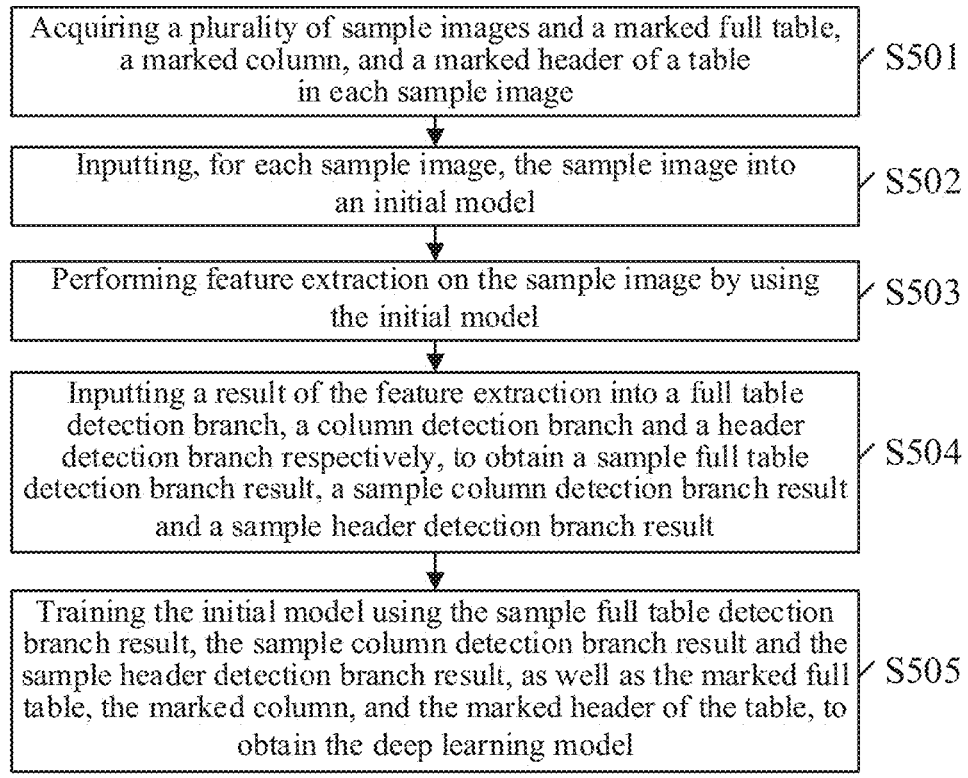
FIG. 5 is a flowchart of a deep learning model obtained by training provided by an embodiment of the present disclosure.

In an alternative embodiment, the method further includes a process of pre-training to obtain the deep learning network, as shown in FIG. 5, the process may include the following steps.

S501, acquiring a plurality of sample images and a marked full table, a marked column, and a marked header of a table in each sample image.

Acquiring a plurality of sample images and marking the plurality of sample images, specifically, for each sample image, marking the full table, the columns of the table, and the header in the sample image.

S502, inputting, for each sample image, the sample image into an initial model.

The initial model may be a model based on any deep learning architecture, for example, a convolutional neural network, a reinforcement learning network, or the like.

S503, performing feature extraction on the sample image by using the initial model.

S504, inputting a result of the feature extraction into a full table detection branch, a column detection branch and a header detection branch respectively, to obtain a sample full table detection branch result, a sample column detection branch result and a sample header detection branch result.

For a simple understanding, the initial model includes a feature extraction module, the full table detection branch, the column detection branch, and the header detection branch.

S505, training the initial model using the sample full table detection branch result, the sample column detection branch result and the sample header detection branch result, as well as the marked full table, the marked column, and the marked header of the table, to obtain the deep learning model.

Specifically, calculating a first loss function value using the sample full table detection branch result and the marked full table of the table, using a first loss function; calculating a second loss function value using the sample column detection branch result and the marked column, using a second loss function; calculating a third loss function value using the sample header detection branch result and the marked header, using a third loss function; summing the first loss function value, the second loss function value and the third loss function value to obtain a total function value; and training the initial model based on the total function value to obtain the deep learning model.

The first loss function, the second loss function, and the third loss function may adopt the same type of loss function. For example, the first loss function is $$L_s = 1 - \frac{2y_s p_s}{y_s - p_s},$$

where $y_s$ is the marked full table of the table, $p_s$ is the sample full table detection branch result predicted by the model, the second loss function is $$L_q = 1 - \frac{2y_q p_q}{y_q - p_q},$$

where $y_q$ is the marked column of the table, $p_q$ is the sample column detection branch result predicted by the model, and the third loss function is $$L_k = 1 - \frac{2y_k p_k}{y_k - p_k},$$

where $y_k$ is the header of the marked table, and $p_k$ is the sample header detection branch result predicted by the model.

$L=L_s+L_q+L_k$ may be understood as a total loss function, and a total loss function value may be obtained by using the total loss function.

A model parameter may be adjusted based on the total loss function value. When the total function value converges or the number of iterations reaches a preset number of iterations, the training ends, and the model parameter when the total function value converges or the number of iterations reaches the preset number of iterations is used as a parameter of the trained deep learning model.

Through the sum of the loss function corresponding to the full table, the loss function of the column and the loss function of the header, that is, the model is trained based on the loss function corresponding to the full table, the loss function of the column and the loss function of the header at the same time, so that the accuracy of the model is higher, and the accuracy of table detection is higher when using this model for table detection.

In this way, the deep learning model for table detection may be trained using the plurality of sample images.

In this way, in the process of table detection, the to-be-processed image may be input into the deep learning model, the results of the three branches are directly output through the deep learning model, and then the detection result of the table may be finally determined based on the results of the three branches. Specifically, the process of finally determining the detection result of the table based on the results of the three branches has been described in detail in the above embodiment, and detailed description thereof will be omitted.

In an embodiment of the present disclosure, the detection of table range may be performed through the deep learning model. Prior knowledge of the table, such as prior knowledge of the table in medical detailed bills, may be combined and structural information of the header row and the table column may be added, that is, the deep learning model is trained by using sample images containing tables, such as images of medical bills, so that the deep learning model may learn the structural information of the table. In this way, the detection results of the full table, the column and the header may be output through the deep learning model, and the final detection result of the table may be obtained based on the detection results of these three dimensions. It effectively solves the limitation problem in the related art that only standard tables can be detected, may realize the table detection for medical detailed bills, and improve the usability of table detection. In addition to the detection of the full table, the detection results for the column and the header are also obtained, and the detection results for the column and the header are used to strengthen the detection result of the full table, which can improve the detection accuracy.

Figure 6:
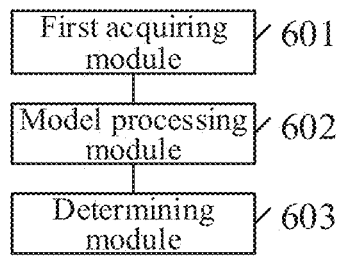
FIG. 6 is a schematic structural diagram of an apparatus for detecting a table provided according to an embodiment of the present disclosure.

Corresponding to the method for detecting a table provided by the above embodiments, an embodiment of the present disclosure further provided an apparatus for detecting a table, as shown in FIG. 6, the apparatus including: a first acquiring module 601, configured to acquire a to-be-processed image; a model processing module 602, configured to input the to-be-processed image into a pre-trained deep learning model, and output a full table detection branch result, a column detection branch result and a header detection branch result through the deep learning model; where the full table detection branch result represents a detection result for a full table in the to-be-processed image, the column detection branch result represents a detection result for a column in the table in the to-be-processed image, and the header detection branch result represents a detection result for a header in the to-be-processed image; and a determining module 603, configured to obtain a detection result of the table in the to-be-processed image, based on the full table detection branch result, the column detection branch result and the header.

Alternatively, the determining module 603 is further configured to: superimpose the full table detection branch result, the column detection branch result and the header detection branch result; and fit a boundary range to a result obtained by the superposition, to obtain a detection frame for the table in the to-be-processed image.

Alternatively, the full table detection branch result includes a full table detection branch binary map, and the full table detection branch binary map indicates whether each pixel in the to-be-processed image belongs to the full table; the column detection branch result includes a column detection branch binary map, the column detection branch binary map indicates whether each pixel in the to-be-processed image belongs to the column in the table; and the header detection branch result includes a header detection branch binary map, and the header detection branch binary map indicates whether each pixel in the to-be-processed image belongs to the header.

The determining module 603 is further configured to: determine a union of the full table detection branch binary map, the column detection branch binary map and the header detection branch binary map to obtain a union binary map; determine a connected region in the union binary map; and determine an enclosing rectangle of the connected region, where the enclosing rectangle is the detection frame for the table in the to-be-processed image.

Figure 7:
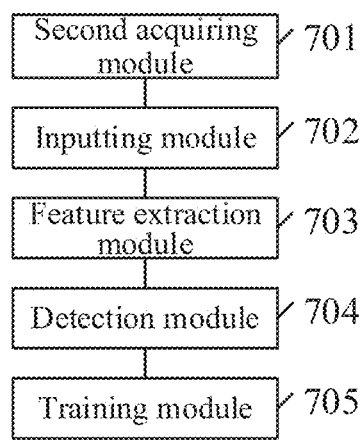
FIG. 7 is another schematic structural diagram of the apparatus for detecting a table provided according to an embodiment of the present disclosure.

Alternatively, as shown in FIG. 7, the apparatus further includes: a second acquiring module 701, configured to acquire a plurality of sample images and a marked full table, a marked column, and a marked header of a table in each sample image; an inputting module 702, configured to input, for each sample image, the sample image into an initial model; a feature extraction module 703, configured to perform feature extraction on the sample image by using the initial model; a detection module 704, configured to input a result of the feature extraction into a full table detection branch, a column detection branch and a header detection branch respectively, to obtain a sample full table detection branch result, a sample column detection branch result and a sample header detection branch result; and a training module 705, configured to train the initial model using the sample full table detection branch result, the sample column detection branch result and the sample header detection branch result, as well as the marked full table, the marked column, and the marked header of the table, to obtain the deep learning model.

Alternatively, the training module 705 is further configured to: calculate a first loss function value using the sample full table detection branch result and the marked full table of the table, using a first loss function; calculate a second loss function value using the sample column detection branch result and the marked column, using a second loss function; calculate a third loss function value using the sample header detection branch result and the marked header, using a third loss function; sum the first loss function value, the second loss function value and the third loss function value to obtain a total function value; and train the initial model based on the total function value to obtain the deep learning model.

In the technical solution of the present disclosure, the acquisition, storage and application of the user personal information are all in accordance with the provisions of the relevant laws and regulations, and the public order and good customs are not violated.

According to an embodiment of the present disclosure, the present disclosure also provides an electronic device, a computer readable storage medium, and a computer program product.

Figure 8:
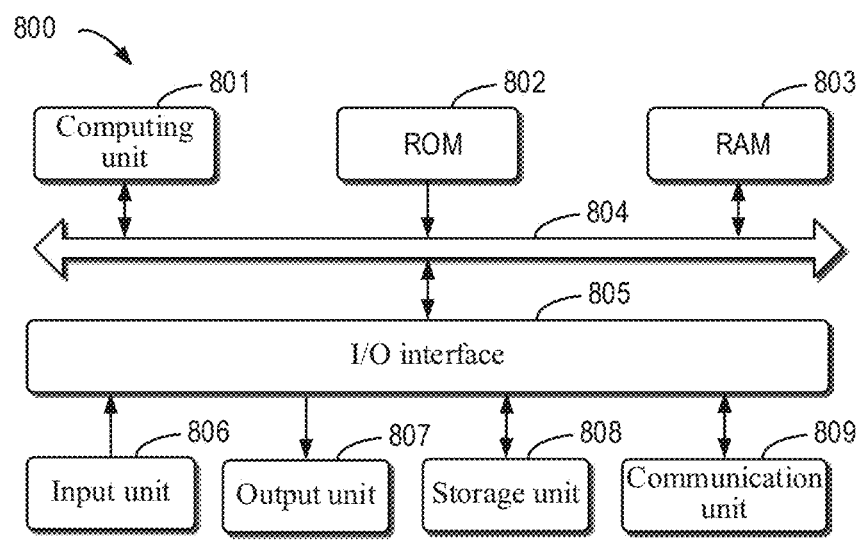
FIG. 8 is a block diagram of an electronic device used to implement the method for detecting a table according to an embodiment of the present disclosure.

FIG. 8 shows a schematic block diagram of an example electronic device 800 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the device 800 includes a computing unit 801, which may perform various appropriate actions and processing, based on a computer program stored in a read-only memory (ROM) 802 or a computer program loaded from a storage unit 808 into a random access memory (RAM) 803. In the RAM 803, various programs and data required for the operation of the device 800 may also be stored. The computing unit 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, for example, a keyboard and a mouse; an output unit 807, for example, various types of displays and speakers; the storage unit 808, for example, a disk and an optical disk; and a communication unit 809, for example, a network card, a modem, or a wireless communication transceiver. The communication unit 809 allows the device 800 to exchange information/data with other devices over a computer network such as the Internet and/or various telecommunication networks.

The computing unit 801 may be various general-purpose and/or dedicated processing components having processing and computing capabilities. Some examples of the computing unit 801 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 801 performs the various methods and processes described above, such as the method for detecting a table. For example, in some embodiments, the method for detecting a table may be implemented as a computer software program, which is tangibly included in a machine readable medium, such as the storage unit 808. In some embodiments, part or all of the computer program may be loaded and/or installed on the device 800 via the ROM 802 and/or the communication unit 809. When the computer program is loaded into the RAM 803 and executed by the computing unit 801, one or more steps of the method for detecting a table described above may be performed. Alternatively, in other embodiments, the computing unit 801 may be configured to perform the method for detecting a table by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for detecting a table, the method comprising:
   acquiring a to-be-processed image;

inputting the to-be-processed image into a pre-trained deep learning model, and outputting a full table detection branch result, a column detection branch result and a header detection branch result through the deep learning model; wherein the full table detection branch result represents a detection result for a full table in the to-be-processed image, the column detection branch result represents a detection result for a column in the table in the to-be-processed image, and the header detection branch result represents a detection result for a header in the to-be-processed image; and obtaining a detection result of the table in the to-be-processed image, based on the full table detection branch result, the column detection branch result and the header detection branch result by: superimposing the full table detection branch result, the column detection branch result and the header detection branch result; and fitting a boundary range to a result obtained by the superposition, to obtain a detection frame for the table in the to-be-processed image.

2. The method according to claim 1, wherein the full table detection branch result comprises a full table detection branch binary map, and the full table detection branch binary map indicates whether each pixel in the to-be-processed image belongs to the full table; the column detection branch result comprises a column detection branch binary map, the column detection branch binary map indicates whether each pixel in the to-be-processed image belongs to the column in the table; and the header detection branch result comprises a header detection branch binary map, and the header detection branch binary map indicates whether each pixel in the to-be-processed image belongs to the header;

wherein superimposing the full table detection branch result, the column detection branch result and the header detection branch result, comprises:

determining a union of the full table detection branch binary map, the column detection branch binary map, and the header detection branch binary map to obtain a union binary map; and wherein fitting the boundary range to the result obtained by the superposition, to obtain the detection frame for the table in the to-be-processed image, comprises:

determining a connected region in the union binary map; and determining an enclosing rectangle of the connected region, wherein the enclosing rectangle is the detection frame for the table in the to-be-processed image.

3. The method according to claim 1, wherein the method further comprises:

acquiring a plurality of sample images and a marked full table, a marked column, and a marked header of a table in each sample image;

inputting, for each sample image, the sample image into an initial model;

performing feature extraction on the sample image by using the initial model;

inputting a result of the feature extraction into a full table detection branch, a column detection branch and a header detection branch respectively, to obtain a sample full table detection branch result, a sample column detection branch result and a sample header detection branch result; and training the initial model using the sample full table detection branch result, the sample column detection branch result and the sample header detection branch result, as well as the marked full table, the marked column, and the marked header of the table, to obtain the deep learning model.

4. The method according to claim 3, wherein training the initial model using the sample full table detection branch result, the sample column detection branch result and the sample header detection branch result, as well as the marked full table, the marked column, and the marked header of the table, to obtain the deep learning model, comprises:

calculating a first loss function value using the sample full table detection branch result and the marked full table of the table, using a first loss function;

calculating a second loss function value using the sample column detection branch result and the marked column, using a second loss function;

calculating a third loss function value using the sample header detection branch result and the marked header, using a third loss function;

summing the first loss function value, the second loss function value and the third loss function value to obtain a total function value; and training the initial model based on the total function value to obtain the deep learning model.

5. The method according to claim 1, wherein the method further comprises:

acquiring a plurality of sample images and a marked full table, a marked column, and a marked header of a table in each sample image;

inputting, for each sample image, the sample image into an initial model;

performing feature extraction on the sample image by using the initial model;

inputting a result of the feature extraction into a full table detection branch, a column detection branch and a header detection branch respectively, to obtain a sample full table detection branch result, a sample column detection branch result and a sample header detection branch result; and training the initial model using the sample full table detection branch result, the sample column detection branch result and the sample header detection branch result, as well as the marked full table, the marked column, and the marked header of the table, to obtain the deep learning model.

6. The method according to claim 2, wherein the method further comprises:

acquiring a plurality of sample images and a marked full table, a marked column, and a marked header of a table in each sample image;

inputting, for each sample image, the sample image into an initial model;

performing feature extraction on the sample image by using the initial model;

inputting a result of the feature extraction into a full table detection branch, a column detection branch and a header detection branch respectively, to obtain a sample full table detection branch result, a sample column detection branch result and a sample header detection branch result; and training the initial model using the sample full table detection branch result, the sample column detection branch result and the sample header detection branch result, as well as the marked full table, the marked column, and the marked header of the table, to obtain the deep learning model.

7. An electronic device, comprising:
at least one processor; and
a memory communicatively connected to the at least one processor;
wherein the memory stores instructions executable by the at least one processor, and the instructions, when executed by the at least one processor, cause the at least one processor to perform operations, the operations comprising:
acquiring a to-be-processed image;
inputting the to-be-processed image into a pre-trained deep learning model, and outputting a full table detection branch result, a column detection branch result and a header detection branch result through the deep learning model; wherein the full table detection branch result represents a detection result for a full table in the to-be-processed image, the column detection branch result represents a detection result for a column in the table in the to-be-processed image, and the header detection branch result represents a detection result for a header in the to-be-processed image; and
obtaining a detection result of the table in the to-be-processed image, based on the full table detection branch result, the column detection branch result and the header detection branch result by: superimposing the full table detection branch result, the column detection branch result and the header detection branch result; and fitting a boundary range to a result obtained by the superposition, to obtain a detection frame for the table in the to-be-processed image.

8. The electronic device according to claim 7, wherein the full table detection branch result comprises a full table detection branch binary map, and the full table detection branch binary map indicates whether each pixel in the to-be-processed image belongs to the full table; the column detection branch result comprises a column detection branch binary map, the column detection branch binary map indicates whether each pixel in the to-be-processed image belongs to the column in the table; and the header detection branch result comprises a header detection branch binary map, and the header detection branch binary map indicates whether each pixel in the to-be-processed image belongs to the header;
wherein superimposing the full table detection branch result, the column detection branch result and the header detection branch result, comprises:
determining a union of the full table detection branch binary map, the column detection branch binary map, and the header detection branch binary map to obtain a union binary map; and
wherein fitting the boundary range to the result obtained by the superposition, to obtain the detection frame for the table in the to-be-processed image, comprises:
determining a connected region in the union binary map; and
determining an enclosing rectangle of the connected region, wherein the enclosing rectangle is the detection frame for the table in the to-be-processed image.

9. The electronic device according to claim 7, wherein the operations further comprise:
acquiring a plurality of sample images and a marked full table, a marked column, and a marked header of a table in each sample image;
inputting, for each sample image, the sample image into an initial model;
performing feature extraction on the sample image by using the initial model;
inputting a result of the feature extraction into a full table detection branch, a column detection branch and a header detection branch respectively, to obtain a sample full table detection branch result, a sample column detection branch result and a sample header detection branch result; and
training the initial model using the sample full table detection branch result, the sample column detection branch result and the sample header detection branch result, as well as the marked full table, the marked column, and the marked header of the table, to obtain the deep learning model.

10. The electronic device according to claim 9, wherein training the initial model using the sample full table detection branch result, the sample column detection branch result and the sample header detection branch result, as well as the marked full table, the marked column, and the marked header of the table, to obtain the deep learning model, comprises:
calculating a first loss function value using the sample full table detection branch result and the marked full table of the table, using a first loss function;
calculating a second loss function value using the sample column detection branch result and the marked column, using a second loss function;
calculating a third loss function value using the sample header detection branch result and the marked header, using a third loss function;
summing the first loss function value, the second loss function value and the third loss function value to obtain a total function value; and
training the initial model based on the total function value to obtain the deep learning model.

11. The electronic device according to claim 7, wherein the operations further comprise:
acquiring a plurality of sample images and a marked full table, a marked column, and a marked header of a table in each sample image;
inputting, for each sample image, the sample image into an initial model;
performing feature extraction on the sample image by using the initial model;
inputting a result of the feature extraction into a full table detection branch, a column detection branch and a header detection branch respectively, to obtain a sample full table detection branch result, a sample column detection branch result and a sample header detection branch result; and
training the initial model using the sample full table detection branch result, the sample column detection branch result and the sample header detection branch result, as well as the marked full table, the marked column, and the marked header of the table, to obtain the deep learning model.

12. The electronic device according to claim 8, wherein the operations further comprise:
acquiring a plurality of sample images and a marked full table, a marked column, and a marked header of a table in each sample image;
inputting, for each sample image, the sample image into an initial model;
performing feature extraction on the sample image by using the initial model;
inputting a result of the feature extraction into a full table detection branch, a column detection branch and a header detection branch respectively, to obtain a sample full table detection branch result, a sample column detection branch result and a sample header detection branch result; and training the initial model using the sample full table detection branch result, the sample column detection branch result and the sample header detection branch result, as well as the marked full table, the marked column, and the marked header of the table, to obtain the deep learning model.

13. A non-transitory computer readable storage medium storing computer instructions, wherein, the computer instructions when executed by the at least one processor, cause the at least one processor to perform operations, the operations comprising:

acquiring a to-be-processed image;

inputting the to-be-processed image into a pre-trained deep learning model, and outputting a full table detection branch result, a column detection branch result and a header detection branch result through the deep learning model; wherein the full table detection branch result represents a detection result for a full table in the to-be-processed image, the column detection branch result represents a detection result for a column in the table in the to-be-processed image, and the header detection branch result represents a detection result for a header in the to-be-processed image; and obtaining a detection result of the table in the to-be-processed image, based on the full table detection branch result, the column detection branch result and the header detection branch result by: superimposing the full table detection branch result, the column detection branch result and the header detection branch result; and fitting a boundary range to a result obtained by the superposition, to obtain a detection frame for the table in the to-be-processed image.

14. The non-transitory computer readable storage medium according to claim 13, wherein the full table detection branch result comprises a full table detection branch binary map, and the full table detection branch binary map indicates whether each pixel in the to-be-processed image belongs to the full table; the column detection branch result comprises a column detection branch binary map, the column detection branch binary map indicates whether each pixel in the to-be-processed image belongs to the column in the table; and the header detection branch result comprises a header detection branch binary map, and the header detection branch binary map indicates whether each pixel in the to-be-processed image belongs to the header;

wherein superimposing the full table detection branch result, the column detection branch result and the header detection branch result, comprises:

determining a union of the full table detection branch binary map, the column detection branch binary map, and the header detection branch binary map to obtain a union binary map; and wherein fitting the boundary range to the result obtained by the superposition, to obtain the detection frame for the table in the to-be-processed image, comprises:

determining a connected region in the union binary map; and determining an enclosing rectangle of the connected region, wherein the enclosing rectangle is the detection frame for the table in the to-be-processed image.

15. The non-transitory computer readable storage medium according to claim 13, wherein the operations further comprise:

acquiring a plurality of sample images and a marked full table, a marked column, and a marked header of a table in each sample image;

inputting, for each sample image, the sample image into an initial model;

performing feature extraction on the sample image by using the initial model;

inputting a result of the feature extraction into a full table detection branch, a column detection branch and a header detection branch respectively, to obtain a sample full table detection branch result, a sample column detection branch result and a sample header detection branch result; and training the initial model using the sample full table detection branch result, the sample column detection branch result and the sample header detection branch result, as well as the marked full table, the marked column, and the marked header of the table, to obtain the deep learning model.

16. The non-transitory computer readable storage medium according to claim 15, wherein training the initial model using the sample full table detection branch result, the sample column detection branch result and the sample header detection branch result, as well as the marked full table, the marked column, and the marked header of the table, to obtain the deep learning model, comprises:

calculating a first loss function value using the sample full table detection branch result and the marked full table of the table, using a first loss function;

calculating a second loss function value using the sample column detection branch result and the marked column, using a second loss function;

calculating a third loss function value using the sample header detection branch result and the marked header, using a third loss function;

summing the first loss function value, the second loss function value and the third loss function value to obtain a total function value; and training the initial model based on the total function value to obtain the deep learning model.

17. The non-transitory computer readable storage medium according to claim 13, wherein the operations further comprise:

acquiring a plurality of sample images and a marked full table, a marked column, and a marked header of a table in each sample image;

inputting, for each sample image, the sample image into an initial model;

performing feature extraction on the sample image by using the initial model;

inputting a result of the feature extraction into a full table detection branch, a column detection branch and a header detection branch respectively, to obtain a sample full table detection branch result, a sample column detection branch result and a sample header detection branch result; and training the initial model using the sample full table detection branch result, the sample column detection branch result and the sample header detection branch result, as well as the marked full table, the marked column, and the marked header of the table, to obtain the deep learning model.

* * * * *